United States Patent [19]

Gement

[11] Patent Number: 5,253,764

[45] Date of Patent: Oct. 19, 1993

[54] SYSTEM FOR TREATMENT OF HOUSEHOLD WASTE

[76] Inventor: Paul Gement, 1920 Woodvine St., Mandeville, La. 70448

[21] Appl. No.: 907,670

[22] Filed: Jul. 2, 1992

[51] Int. Cl.$^5$ .............................................. B03B 1/00
[52] U.S. Cl. .................................................. 209/3; 241/21
[58] Field of Search ............... 209/3; 241/15, 17, 21, 241/23, 26, DIG. 38

[56] References Cited

U.S. PATENT DOCUMENTS

| | | | |
|---|---|---|---|
| 3,587,851 | 6/1971 | Anderson | 209/74 |
| 3,993,252 | 11/1976 | Ito et al. | 241/21 |
| 4,033,907 | 7/1977 | Baldyga | 241/24 |
| 4,093,516 | 6/1978 | Lang | 195/27 |
| 4,094,740 | 6/1978 | Lang | 195/27 |
| 4,106,627 | 8/1978 | Foster | 162/7 |
| 4,157,961 | 6/1979 | Borst | 210/33 |
| 4,185,680 | 1/1980 | Lawson | 162/5 |
| 4,264,352 | 4/1981 | Houser | 71/9 |
| 4,288,550 | 9/1981 | Ishida et al. | 435/167 |
| 4,321,150 | 3/1982 | McMullen | 210/769 |
| 4,342,830 | 8/1982 | Holloway | 435/161 |
| 4,511,091 | 4/1985 | Vasco | 241/23 |
| 4,533,034 | 8/1985 | Gregg | 198/472 |
| 4,540,495 | 9/1985 | Holloway | 210/774 |
| 4,570,861 | 2/1986 | Zentgraf et al. | 241/24 |
| 4,607,797 | 8/1986 | Enikolopow et al. | 241/23 |
| 4,699,324 | 10/1987 | Ahs | 241/21 |
| 4,844,351 | 7/1989 | Holloway | 241/19 |
| 4,974,781 | 12/1990 | Placzek | 241/17 |

*Primary Examiner*—Robert P. Olszewski
*Assistant Examiner*—Kenneth Noland
*Attorney, Agent, or Firm*—Pravel, Hewitt, Kimball & Krieger

[57] ABSTRACT

A system for treating household municipal wastes, and recovering recyclable materials from the waste stream. The process includes feeding the substantially solid waste stream, comprising generally paper or pulp material, glass, metal, plastics, and other solid wastes, into a first vessel, containing heated water; rotating the vessel to intermix the solid wastes with the water under a predetermined pressure; subjecting the vessel containing the wetted materials to a vacuum so as to achieve a desired moisture content to the pulp materials preferably between 20 to 30%; conveying the materials from the vessel to be separated into component parts; providing a second treatment vessel for receiving the material in alternate use; cycling the water from the first vessel into the second vessel so that the water in the system is in a closed loop system; and routing the removed pulp material containing 20 to 25% moisture for further use or disposal.

16 Claims, 2 Drawing Sheets

SYSTEM FOR TREATMENT OF HOUSEHOLD WASTE

BACKGROUND OF THE INVENTION

1. Field of the Invention

The present invention relates to treatment of household waste products. More particularly, the present invention relates to a system to recover recyclable materials from the municipal solid waste stream, so the materials do not have to undergo subsequent treatment and purification.

2. General Background

At the present time, one of the most pressing problem facing the country, and the individual communities therein, is the collection, treatment and disposal of municipal wastes. The use of landfills is swiftly becoming impractical because of the shortage of land, and municipalities will soon have to face alternate methods to dispose of such wastes. It is well documented that much of the household waste collected by municipalities comprises a great deal of recyclable material, which, if separated and treated properly, can be recovered or recycled. However, systems that have been developed, and as are shown in the prior art in the accompanying prior art statement, fall short of solving the problem. For example, since a vast amount of the waste material consists of paper or pulp products, the separation of the pulp material from other material, such as glass, metal, plastic, or the like, is extremely difficult. If the waste washed during a process, then the dewatering of the pulp or paper is needed, which results in a further expensive process, and compounds the problem of waste water discharge.

Therefore, it is advantageous to have a system which will clean, separate and dry municipal household wastes, so that the paper or pulp materials can be easily separated from the other materials, and the resultant products can be recycled separately.

SUMMARY OF THE PRESENT INVENTION

The system of the present invention solves the shortcomings in the art in a simple and straightforward manner. What is provided is a system for treating household municipal wastes, and recovering recyclable materials from the waste stream. The process includes feeding the substantially solid waste stream, comprising generally paper or pulp material, glass, metal, plastics, and other solid wastes, into a first vessel, containing heated water; rotating the vessel to intermix the solid wastes with the water under a predetermined pressure; subjecting the vessel containing the wetted materials to a vacuum so as to achieve a desired moisture content to the pulp materials preferably between 20 to 30%; conveying the materials from the vessel to be separated into component parts; providing a second treatment vessel for receiving the material in alternate use; cycling the water from the first vessel into the second vessel so that the water in the system is in a closed loop system; and routing the removed pulp material containing 20 to 25% moisture for further use or disposal.

Therefore, it is a principal object of the present invention to provide a system for purging, sterilizing and drying of household municipal garbage, so that the components can be separated during the process.

It is a further object of the present invention to provide a system of applying a wetting agent to household garbage, under heat and pressure, removing sufficient moisture from the pulp material in the treated garbage so that the pulp material separates easily from the remaining components.

It is a further object of the present invention to provide a system of separating household municipal solid wastes into paper or pulp components, glass, metal, plastic, or the like, so that the materials can be disposed of or recycled after treatment.

It is a further object of the present invention to treat household municipal garbage so that the garbage is sterilized, and following treatment, the garbage has no greater than 20% to 25% moisture content.

BRIEF DESCRIPTION OF THE DRAWINGS

For a further understanding of the nature and objects of the present invention, reference should be had to the following detailed description taken in conjunction, ,with the accompanying drawings, in which like parts are given like reference numerals, and wherein.

DETAILED DESCRIPTION OF THE PREFERRED EMBODIMENT

Figure 1:
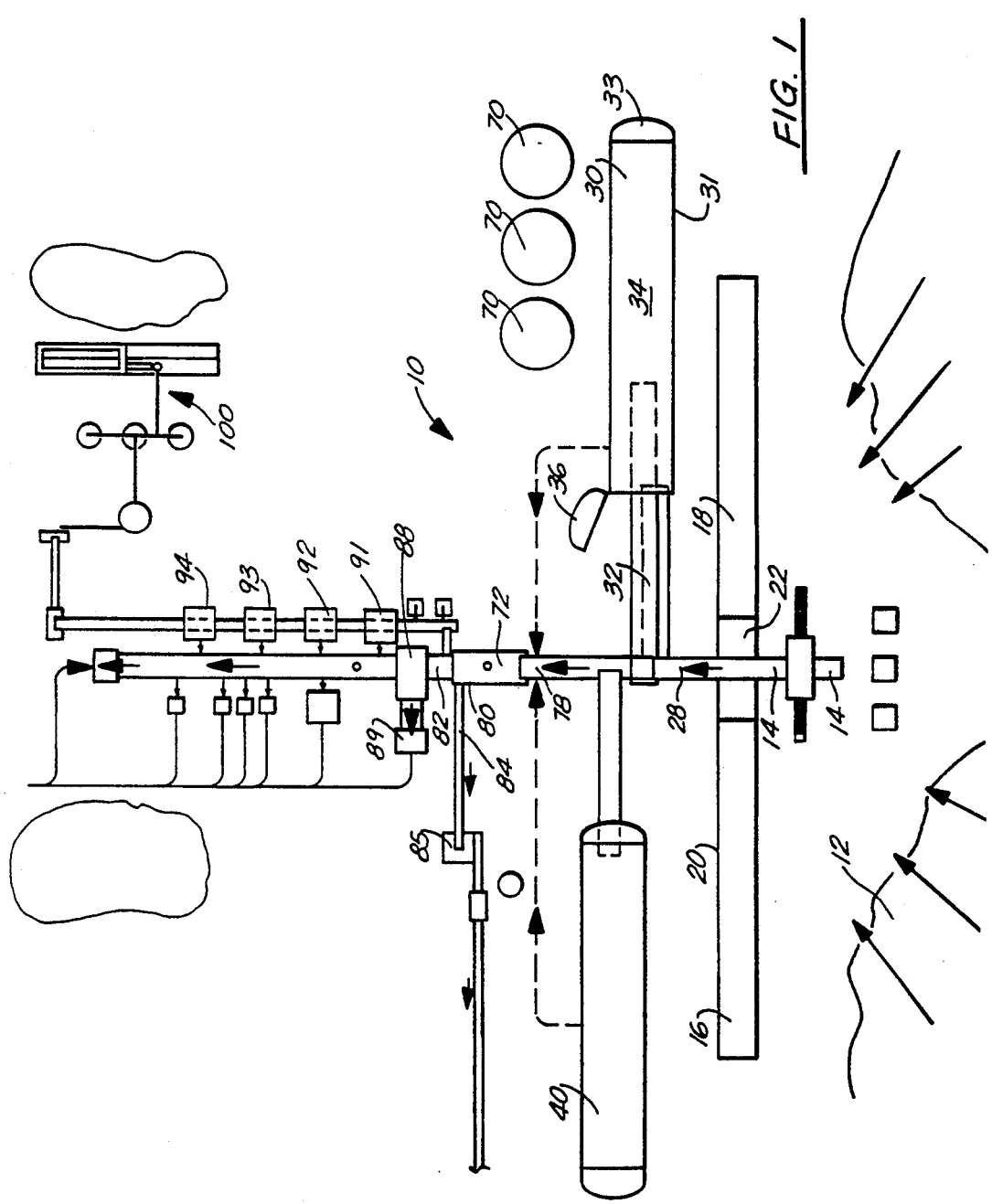
FIG. 1 illustrates an overall view of the preferred embodiment of the system of the present invention.
Figure 3:
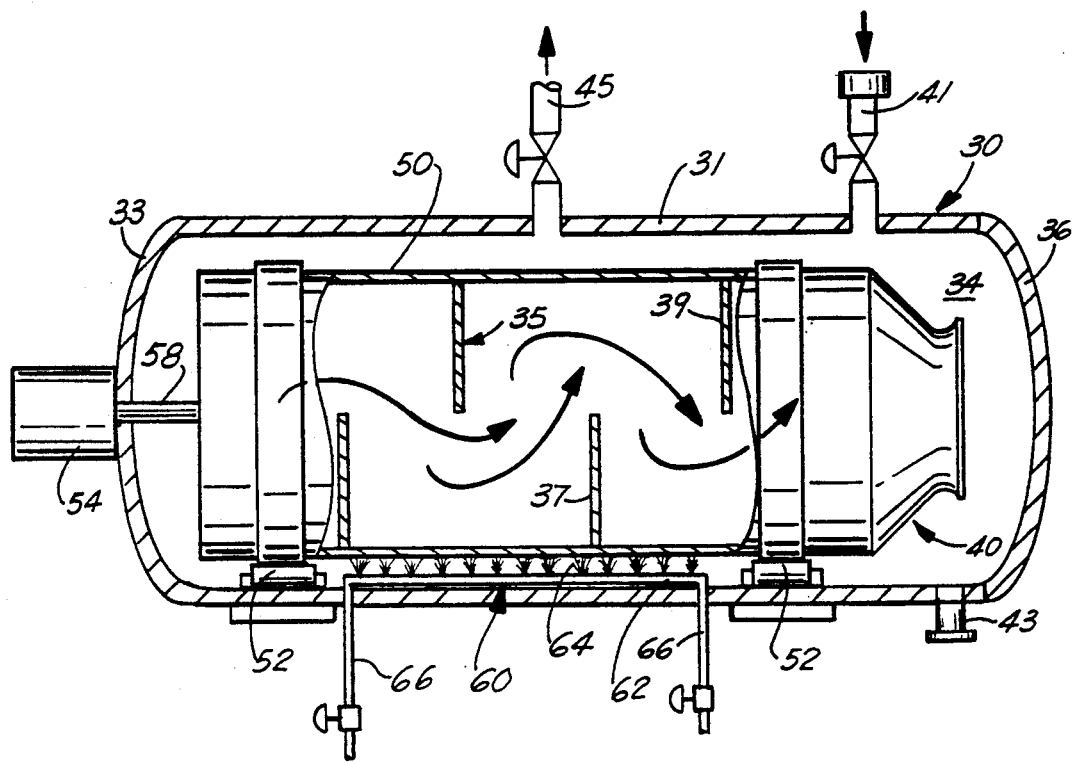
FIG. 3 illustrates an isolated view of the treatment vessel in the preferred embodiment of the system of the present invention.
Figure 2:
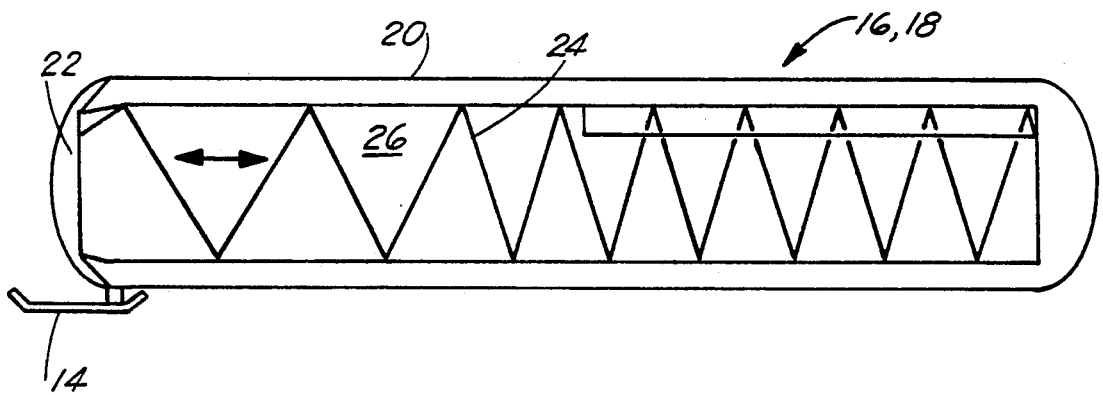
FIG. 2 illustrates an isolated view of the feed augur component in the preferred embodiment of the system of the present invention.

FIGS. 1-3 illustrate the preferred embodiment of the system of the present invention by the numeral 10, as seen in overall view more particularly in FIG. 1. As illustrated, the system 10 would comprise, as seen in FIG. 1, a general receiving or "tipping" area 12, which may be 20,000 square feet of paved area, where the household municipal wastes would be brought into the system for further treatment. Generally, this would involve simply a dumping area for garbage trucks or the like. Following any removal of items, such as rubber tires or the like manually, the remaining garbage is then placed on a chain conveyor 14 which convey the materials to a first and second feed hoppers 16, 18 respectively.

As seen in FIG. 2, feed hoppers 16, 18 would generally comprise a tubular outer body portion 20, having an end opening 22, at the end nearest the conveyor 14, so that the garbage may be introduced into the hoppers 16, 18. The hoppers would include a screw auger 24 within its interior 26, so that the waste may be pulled into the entire interior 26 of hoppers 16, 18. Following the filling of each hopper 16, 18 with wastes, the hoppers 16, 18 serve as a holding zone for further introduction of the waste into the actual treatment vessels. For purposes of further clarification, the interior space of each hopper 16, 18 would be equal to the interior space of each of the treatment vessels, so that the operators are assured that the total amount of wastes contained in each hopper 16, 18 can be placed within each treatment vessel.

Following the placement of the wastes into hoppers 16, 18, a first hopper 16 is then opened, and the wastes, with the use of reversing the auger 24, is removed onto a chain conveyor 28 to be conveyed into a first treatment vessel 30, as illustrated in FIGS. 1 and 3 respectively. As seen in FIG. 1, the conveyor 28 would convey the wastes from hopper 16 onto a transverse conveyor 32, which would convey the materials directly into the interior 34 of first treatment vessel 30. As seen in FIG. 1, the first vessel 30 has a hinged door 36 on its end to receive the conveyor 32 into its interior 34, to ease in the transport of the wastes thereinto. Following the transport of all of the wastes from the interior of hopper 16 into the interior 34 of first treatment vessel 30, door 36 is sealed shut so that the treatment may begin.

As in seen in FIG. 1, there is also illustrated a second treatment vessel 40. Second vessel 40 would be an identical vessel to vessel 30, and would receive wastes from hoppers 16, 18. In effect, during the process, each of the vessels 30, 40 would work in alternate treatment time periods, so that continuous treatment could be undertaken. More specifics regarding their operation will be explained further.

Turning now to the structure and operation of the vessels 30, 40, reference will be made to vessel 30. As seen, first treatment vessel 30 would generally be formed as a tubular elongated vessel, circular in cross-section, and having a continuous sidewall 31. Vessel 30 would include a far end portion 33, and as described earlier, a door 36 which would move between open and closed positions during use. FIG. 1 illustrates door 36 of first treatment vessel 30 in the open position.

The interior space 34 within vessel 30 would include a means 40 for heating, separating and churning the waste product after it has been fed into the interior of treatment vessel 30, via conveyor 32, as seen in FIG. 1. As illustrated in FIG. 3, this means 40 would comprise a chamber 50 supported within the main vessel 30, chamber 50 resting a system of rollers 52 positioned on the floor of vessel 30, for rotating chamber 50 about its horizontal axis during the process. The rotation of chamber 50 is powered by a motor 54 positioned at the second end of vessel 30, and having a drive shaft 58 for rotating chamber 50 when shaft 58 is turned. As is seen, motor 54 is outside of vessel 30, with drive shaft 58 extending through the end portion 33 of vessel 30. Further, to impart heat to the interior of vessel 30, there may be provided a heating means 60, which comprises a gas operated burner assembly 62, wherein a plurality of gas jets 64 allow natural gas to produce a flame directly into vessel 30 as seen in FIG. 3. The gas jets are provided with gas via gas line 66 leading into the interior of vessel 30. As further illustrated, chamber 50 is provided with a plurality of alternating baffles 35, with the baffles 35 extending downward from the top of the chamber wall 31, as baffles 37, and baffles 39 extending up from the bottom of the wall 31 of the chamber 50. The baffles would provide a continuous travel space 37 between the ends 39 of the baffles 37, 39, to allow the waste and fluids introduced into the chamber 50 to travel and mix.

As further illustrated, the vessel 30 is provided with a first inlet water or steam line 41, for receiving water or steam initially into the vessel 30 when treatment commences, and for receiving water from second treatment vessel 40, and an outlet water or steam line 43 for removing the excess water and for routing water from vessel 30 to second vessel 40 during the process. As illustrated, vessel 30 also provides a line 45, which would be used to pull a partial vacuum in the interior of vessel 30, to be explained further. It should be again made clear, that the structure as described for vessel 30 would likewise apply for companion vessel 40.

Turning now to the operation of the vessels, for example vessel 30, following introduction of the wastes from a hopper 16 or 18 into chamber 50 within vessel 30, the door 36 of vessel 30 is closed shut, and the interior space 34 of vessel 30 may be heated and pressurized. The wastes within vessel 30 would be heated through heating means 60, to increase to temperature within the vessel 30. Following the heating of the vessel 30 by heating means 60, heated water or steam would then be introduced via line 41 into vessel 30, depending on the temperature to which the vessel has been heated. The water to be utilized in the system may be kept in storage tanks 70, and be pumped from the tanks 70 into the vessels 30 or 40 as needed during the process.

Following the introduction the water, or other wetting agents suitable to pulp the paper or cellulose-based products within the waste stream, chamber 50 would be rotated very slowly to allow all of the wastes to be subjected to the wetting agent, and full pulping can be obtained.

The wastes within chamber 50 would be subjected to heated water or steam, under pressure, for a sufficient amount of time, preferably 30 to 90 minutes, depending on the initial content of the waste material in the stream, but sufficient to thoroughly pulp the cellulose material within the waste. Following this time period, the vessel interior 34 is then subjected to a partial vacuum from line 45, which would in effect remove the fluids introduced into the vessel earlier. This vacuum would be applied until the waste within the vessel 30 would have a moisture content below 65%, and preferably in the range of 20% to 30% moisture content. Of course, it is foreseen, that depending on the needs for a specific batch of garbage being treated, the water or moisture content may range from 0% to 100%, which would be controlled by the amount of moisture, if any, removed under vacuum.

Following the treatment of the waste stream in the vessel 30, a second quantity of waste, which has been previously conveyed from one of the hoppers 16, 18 into second vessel 40, may begin undergoing treatment in a similar fashion. However, rather than the second vessel 40 receiving a second quantity of water from the original water source as did vessel 30, the second vessel 40 would receive the water (or wetting agent) that was removed from vessel 30 during the treatment process and routed for use to second vessel 40. The only new water used would be the water needed to restore the original quantity of water since some has been absorbed by the waste during treatment. It is clear, therefore, that in this closed loop system, waste water is not produced for subsequent disposal which may be environmentally detrimental. Instead, the closed-loop system allows the continuous use of the water, without having to dispose of waste water.

Following the process in either of the vessels 30 or 40, depending which is completed the treatment steps, the door 36 is opened to the vessel and the slightly moisturized wastes are removed via the conveyor 32 that transported it in initially.

The waste would then be conveyed to a three-decked screener 72, which would include preferably an upper deck screen, having openings of 2 inches in cross-section, so all materials two inches or above would not fall through. These larger materials would then be conveyed via a top conveyor 78 to other stations.

The materials below two inches in diameter would fall through a second screen having preferably openings of ⅜ inches. Any material sized greater than that would go off yet another conveyor 82 to other stations. The final deck would receive all materials smaller than ⅜ inches in diameter. This material for the most part would be the partially dried cellulose material, which would be conveyed via yet a third conveyor 84 to a storage bin 85 and further for treatment and use.

The materials that were discussed earlier which either did not fall through the two-inch screen, or through the second screen 80, would be conveyed to stations which would, for the most part include mechanical and manual separation. For example, as seen in FIG. 1, there would be provided a means for removing the metallic base materials through a magnet 88, so that they are automatically removed from the stream and disposed of. For purposes of the aluminum based materials, a charger station 89 would be provided to magnetize the aluminum, so that it could also be removed by the magnet 88.

There would be further stations 91, 92, 93 and 94 where operators would manually remove the glass from the stream, and other stations where plastics would be removed from the stream. Following these steps, the remaining materials would be broken china or ceramic which would be manually packaged and discarded.

The plastic materials, in this process, most of which would be collected at the second screen 80, would be manually removed and processed through a plastic extrusion equipment 100, which would transform the plastic waste material to plastic lumber or the like. The process undertaken to do this is known in the art, but is one of the end processes that can be accomplished from this overall novel separation technique as previously described.

Glossary of Terms system 10
tipping area 12
chain conveyor 14
first and second hoppers 16, 18
outer body portion 20
end opening 22
screw auger 24
interior 26
chain conveyor 28
first treatment vessel 30
transverse conveyor 32
interior 34
hinged door 36
second treatment vessel 40
sidewall 31
end portion 33
means 40
chamber 50
rollers 52
motor 54
drive shaft 58
heating means 60
burner assembly 62
gas jets 64
gas line 66
baffles 35
baffles 37, 39
first inlet steam line 41
outlet steam line 43
line 45
storage tanks 70
3-deck screener 72
upper screen 74
openings 76
top conveyor 78
second screen 80
second conveyor 82
third conveyor 84
storage bin 85
magnet 88
charger station 89
extrusion equipment 100
stations 91, 92, 93, 94.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A process for treating a diverse waste stream containing cellulose-based material, comprising:
    a. placing the waste into a treatment vessel having an interior space;
    b. heating the vessel containing the waste under a certain pressure;
    c. introducing a wetting agent into the vessel containing the waste;
    d. agitating the waste and the wetting agent under heat and pressure for a sufficient period of time to subject most of the cellulose product to the wetting agent; and
    e. applying a partial vacuum to the interior of the sealed vessel, to remove sufficient moisture from the waste so that the cellulose material does not adhere to the other components in the waste stream upon removal.

2. The process in claim 1, wherein the diverse waste stream would comprise generally paper material, plastic, metal, and glass waste.

3. The process in claim 1, wherein the process would further comprise the initial step of conveying the waste product into a hopper being of an exact size as the treatment vessel so that the quantity of waste contained in the hopper may be conveyed directly into the treatment vessel.

4. The process in claim 3, wherein the waste would be conveyed into the hopper and then into the treatment vessel via a series of conveyor belts.

5. The process in claim 1, wherein the vessel would be heated to a temperature between one hundred and two hundred degrees fahrenheit.

6. The process in claim 1, wherein the wetting agent would comprise water, or a suitable wetting agent for causing the cellulose to form a pulp material.

7. The process in claim 1, wherein the waste would be agitated preferably by rolling the vessel as the heat is applied to the vessel.

8. The process in claim 1, wherein the vessel would further comprise a plurality of baffles extending from the wall of the vessel to separate the waste into zones within the vessel.

9. The process in claim 1, wherein the partial vacuum applied to the interior of the vessel would remove a predetermined quantity of moisture from the waste, so that between twenty and twenty-five percent moisture would be maintained within the cellulose base material.

10. A process for treating a diverse waste stream of household wastes containing cellulose-based material, comprising:

a. placing the waste into a first treatment vessel having an interior space;
b. heating the first vessel containing the waste under a certain pressure;
c. introducing a wetting agent, such as heated water, into the vessel containing the waste;
d. agitating the waste and the wetting agent under heat and pressure for a sufficient period of time to subject most of the cellulose-based product to the wetting agent so that the cellulose-based product forms a pulp material; and
e. applying a partial vacuum to the interior of the sealed vessel, to remove sufficient moisture from the cellulose-based product so that the cellulose material does not adhere to the other components in the waste stream upon removal.

11. The process in claim 10, wherein there would be included at least a second treatment vessel for treating the waste similarly to the treatment in the first treatment vessel while the first treatment vessel is inoperative.

12. The process in claim 10, wherein the vessel would be heated via an external heating source.

13. The process in claim 10, wherein the wetting agent may be heated water in the form of steam.

14. The process in claim 10, wherein upon removal of the waste material from the vessel, the waste material would then be routed to a series of stations comprising:
   a) a magnetic metal removal station;
   b) a manual plastics removal station;
   c) a glass removal station; and
   d) a plurality of screeners to separate the waste material into their respective sizes.

15. A process for treating a diverse waste stream of household wastes containing cellulose-based material, comprising:
   a. placing the waste into a first treatment vessel having an interior space;
   b. heating the first vessel containing the waste under a certain pressure;
   c. introducing heated water or steam into the vessel containing the waste;
   d. agitating the waste and the heated water under heat and pressure for a sufficient period of time to subject most of the cellulose-based product to the heated water so that the cellulose-based product forms a pulp material;
   e. applying a partial vacuum to the interior of the sealed vessel, to remove moisture from the cellulose-based product so that the resultant cellulose material has a moisture content not to exceed 50% and does not adhere to the other components in the waste stream upon removal.

16. A process for treating a diverse waste stream of household wastes containing cellulose-based material, comprising:
   a. placing the waste into a first treatment vessel having an interior space;
   b. heating the first vessel containing the waste under a certain pressure;
   c. introducing heated water or steam into the vessel containing the waste;
   d. agitating the waste and the heated water under heat and pressure for a sufficient period of time to subject most of the cellulose-based product to the heated water so that the cellulose-based product forms a pulp material;
   e. applying a partial vacuum to the interior of the sealed vessel, to remove moisture from the cellulose-based product so that the resultant cellulose material has a moisture content not to exceed 50% and does not adhere to the other components in the waste stream upon removal;
   f. providing a second treatment vessel for receiving a quantity of the waste stream, for treatment of the stream in a similar fashion as the first vessel, while the first vessel is not being utilized; and
   g. providing a series of stations for receiving the product from the treatment vessels to be further separated into the constituent components of pulp material, glass, metal, plastic or the like.

* * * * *